(12) United States Patent
Imanishi

(10) Patent No.: US 6,816,781 B2
(45) Date of Patent: Nov. 9, 2004

(54) NAVIGATION METHOD AND SYSTEM FOR LARGE COMPOUND

(75) Inventor: Shunichi Imanishi, Farmington Hills, MI (US)

(73) Assignee: Alpine Electronics, Inc, Tokyo (JP)

(*) Notice: Subject to any disclaimer, the term of this patent is extended or adjusted under 35 U.S.C. 154(b) by 0 days.

(21) Appl. No.: 10/251,943

(22) Filed: Sep. 20, 2002

(65) Prior Publication Data
US 2004/0204839 A1 Oct. 14, 2004

(51) Int. Cl.⁷ .............................................. G01C 21/00
(52) U.S. Cl. ...................... 701/209; 701/208; 701/211; 340/988; 340/995.1
(58) Field of Search ................................. 701/209, 208, 701/211, 201; 340/995.1, 990, 988, 995.28

(56) References Cited

U.S. PATENT DOCUMENTS

| | | | |
|---|---|---|---|
| 4,679,147 A | 7/1987 | Tsuji et al. ................. | 701/211 |
| 6,173,232 B1 | 1/2001 | Nanba ......................... | 701/209 |
| 6,542,817 B2 * | 4/2003 | Miyaki ........................ | 701/209 |
| 2002/0049533 A1 * | 4/2002 | Kusano et al. .............. | 701/209 |

FOREIGN PATENT DOCUMENTS

JP    11-23302    1/1999

* cited by examiner

Primary Examiner—Marthe Y. Marc-Coleman
(74) Attorney, Agent, or Firm—Muramatsu & Associates

(57) ABSTRACT

A navigation method and system for accurately determining an optimum route to a destination where such a destination is within a large compound such as a shopping mall, an apartment complex, or the like without requiring a specially made database. The navigation method and system is designed to search for an entrance (target address) by detecting a link in map data, to the large compound within a predetermined distance from an original address. The navigation system evaluates possible routes and selects the best route to the target address. When the road in front of the large compound is constituted by two one-way roads, the navigation method and system searches for a link between the two one-way roads allowing a U-turn and selecting the best route to the target address including the U-turn.

12 Claims, 7 Drawing Sheets

NAVIGATION METHOD AND SYSTEM FOR LARGE COMPOUND

FIELD OF THE INVENTION

This invention relates to a navigation method and system for guiding a user through a calculated route to a destination, and more particularly, to a navigation method and system for accurately determining an optimum route to a destination where such a destination is within a large compound such as a shopping mall, an apartment complex, or the like.

BACKGROUND OF THE INVENTION

A navigation system performs travel guidance for enabling a user to easily reach the selected destination. A typical example is a vehicle navigation system. The present invention is not limited to a vehicle navigation system but is applicable to other types of navigation system such as a PDA (Personal Data Assistant), a cellular phone, and other portable navigation devices. However, for the convenience of explanation, the following description is made mainly for the vehicle navigation system.

Such a navigation system detects the position of the vehicle, reads out map data pertaining to an area at the vehicle current position from a data storage medium, for example, a CD-ROM (compact disc read-only memory), a DVD (digital versatile disc) or a HDD (hard disc drive), and displays a map image on a monitor screen (display) while superimposing a mark representing the current location of the vehicle on the map image. Alternatively, such map data can be provided to the vehicle from a remote server through a communication network such as Internet.

The vehicle position is determined by a self-contained navigation sensors (e.g. a distance traveled sensor and a bearing sensor) mounted in the vehicle or by a global positioning system (GPS) including an artificial satellite (satellite navigation). The satellite enables absolute position detection and higher position accuracy than the self-contained navigation sensors. However, the satellite navigation involves problem of position detection failure such as in a tunnel or a building where the satellite radio signals are obstructed. Therefore, recent navigation systems utilize both self-contained navigation and satellite navigation to achieve improved performances.

As the present position of the vehicle changes with the travel of the vehicle, the vehicle current position mark in the map image on the screen is changed accordingly. Alternatively, the map is scrolled while the vehicle current position mark is fixed at a predetermined position, for example, at the center of the image. In either method, the navigation system enables the driver to recognize the map information of the area at the vehicle position at a glance.

When a destination is not set, such a navigation system functions as a locator map which indicates the current location of the vehicle on a map image. When the destination is set, the navigation system starts a route guidance function for setting a calculated route from the starting point to the destination. Typically, the route guidance function performs an intersection guidance process in which a monitor screen displays an enlarged intersection diagram and the direction in which the vehicle is to travel while displaying the guide route on a map. When a destination is input, a CPU in the navigation system determines a most suitable guided route from the current vehicle position to the destination and successively stores nodes (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a driver of the desired one of roads or directions selectable at the intersection.

In the case where a destination is within a large compound such as a shopping mall or an apartment complex, an address of the destination in the typical map data represents an address number on a street facing the large compound. For example, FIG. 1 shows an example of layout of a shopping mall 20 having shops S1–S7 where a road A runs along the shopping mall 20. In the typical map data, an address of each shop is represented by an address number on the road A of a point defined by an imaginary line connecting between the road A and the shop.

Thus, in the map data, a shop S3 is represented, for example, by an address number at a point Y on the road A. Typically, the point Y is defined by an imaginary line L3 from the shop S3 which perpendicularly intersects with the road A. Similarly, in a navigation system, an address of a shop S6 is defined by an address number at a point X at which an imaginary line L6 from the shop S6 intersects perpendicularly with the road A and an address of a shop S7 is defined by an address number at a point Z at which an imaginary line L7 from the shop S7 intersects in perpendicular to the road A.

Therefore, when a user specifies the shop S6 in the navigation system as her destination, the navigation system calculates various routes to reach the point X on the road A and determines the best route to the point X. However, as shown in FIG. 1, if an entrance E of the shopping mall 20 is relatively far away from the point X, the route calculated by the navigation system may not the best route to the shop S6. In other words, there is a case in that the address of the shop S6 is significantly different from the actual entrance E of the shopping mall 20. In contrast, an address of a relatively small structure, such as a building B1 or B2 (address M or N on road B) will substantially match the physical entrance of the building.

Since a large shopping mall attracts many customers, a relatively large road runs in front of a shopping mall. Sometimes, in the map data used for a navigation system, a large road with center separators is considered two separate roads or two one-way roads (may also referred to as "divided road"). Such an example is shown in FIG. 2 where the road at the front of the shopping mall 20 is configured, in the map data, by a one-way road A1 and another one way road A2. In the situation of FIG. 2, the conventional navigation system may be programmed to allow vehicles only on the one-way road A2 (running toward the left) to enter the shopping mall 20.

Thus, a navigation system may guide the user to travel a route which is substantially longer than other route as shown in FIG. 3A. In the example of FIG. 3A, the navigation system may guide the user to take the one-way road A2 through a road D and road E (east bound), which is an unreasonable route having a much longer distance than a route (reasonable route shown by dotted line) taking a road C and road A1 (west bound). In reality, the reasonable route in FIG. 3A is available since, in many cases, the road A1 of FIG. 3A allows a vehicle to legally make a left turn or U-turn between the center separators.

However, sometimes, conventional navigation systems are not designed to include a U-turn in the guided route. Thus, the user has to take the unreasonable route of FIG. 3A to the destination. Alternatively, even though the navigation system is designed to include a U-turn in the guided route, it is designed so that such a U-turn can only be made at an intersection. Thus, in the example of FIG. 2, a vehicle running on the one-way road A1 (west bound) has to make the U-turn at the intersection IS to take the one-way road A2 as shown in FIG. 3B. This route is unreasonable, since it involves a round-trip between the shopping mall and the intersection IS which is very long.

It may be possible to create, in advance, a special database which includes data indicating one-to-one relationships between shops and nearest entrances of the large compound. However, to create such a special database based on map data available in the market requires an extremely large amount of time and labor, resulting in cost increase of the navigation system. Therefore, as described in the foregoing, in the navigation system, there is a need of an effective way to determine the route to the destination when the destination is in the large compound.

SUMMARY OF THE INVENTION

It is, therefore, an object of the present invention to provide a navigation method and system for accurately determining a calculated route to a destination when the destination is in a large compound.

It is another object of the present invention to provide a navigation method and system for finding an entrance of a large compound as a target address rather than an assigned address of a destination without need of preparing a special database in advance indicating the one-to-one relationship between the destination and the entrance.

It is a further object of the present invention to provide a navigation method and system for finding an entrance of a large compound as a target address and a U-turn position to determine the best route to the target address.

The navigation method and system of the present invention is designed to search a link (entrance) to a large compound within a predetermined distance from an original address. When the link is found, the navigation system determines that the link as a target address and evaluates the possible route to the target address. The navigation method for guiding a user to the destination with use of map data is comprised of the steps of: examining an original address of the destination and judging whether the destination is within a large compound or not based upon the map data, searching for an entrance of the large compound from a road running along the large compound where the original address is on the road and the entrance is searched within a predetermined distance from the original address, defining the entrance of the large compound as a target address to the destination, and selecting a best route to the target address and starting a route guidance mode to guide the user to the entrance of the large compound.

In the process of judging whether the destination is within the large compound, the method of the present invention includes a step of evaluating the address of the destination as well as information on other POIs close to the destination. The process of searching for the entrance of the large compound includes a step of finding a link connecting the road and the large compound by evaluating the map data in backward and forward directions on the road. Further, the process of searching for the entrance of the large compound includes a step of specifying the predetermined search distance on the road from the original address.

The method of the present invention further comprises a step of finding a link connecting between two one-way roads when the map data defines that the road along the large compound as being constituted by the two one-way roads and selecting a best link for reaching the target address when two or more links exist for the road. This process further includes a step of finding a link allowing a U-turn from one one-way road to another one-way road and a step of selecting a link allowing the U-turn from one one-way road to another one-way road which is closest to the target address.

A further aspect of the present invention is a navigation system configured by various means for achieving the navigation method described above which finds the target address of the large compound based on the original address of the destination within the compound and determines the best route to the target address.

According to the present invention, the navigation method and system of the present invention is designed to search a link (entrance) to a large compound within a predetermined distance from an original address. When the link is found, the navigation system determines that the 10 link as a target address and evaluates the possible route to the target address. In the case where the road in front of the large compound is constituted by two one-way roads, the navigation method and system of the present invention searches for a link between the two one-way roads. The is navigation system also checks whether a link between the original address X and the target address E allows a U-turn of a vehicle. Thus, the navigation system is able to find the best route to the target address of the large compound including the U-turn from a one-way road to take another one-way road.

DETAILED DESCRIPTION OF THE INVENTION

The navigation method and apparatus of the present invention will be described in more detail with reference to the accompanying drawings. While the present invention will be described in conjunction with a vehicle navigation system, it will be understood that the present invention is not limited to such a specific application. For example, the present invention can also be applicable to a portable (hand-held) navigation system, a portable data terminal such as a personal digital assistant (PDA), a lap top computer with a navigation function, and the like.

The navigation method and system of the present invention is designed to search a link (entrance) to a large compound within a predetermined distance from an original address. Here, the original address is an address of the destination within the large compound such as a shopping mall, an apartment complex, or the like, which is assigned to the destination without regard to the entrance of the large compound. In the present invention, the navigation method and system evaluates the possible route to the destination with respect to the entrance of the compound as a target address.

Figure 4:
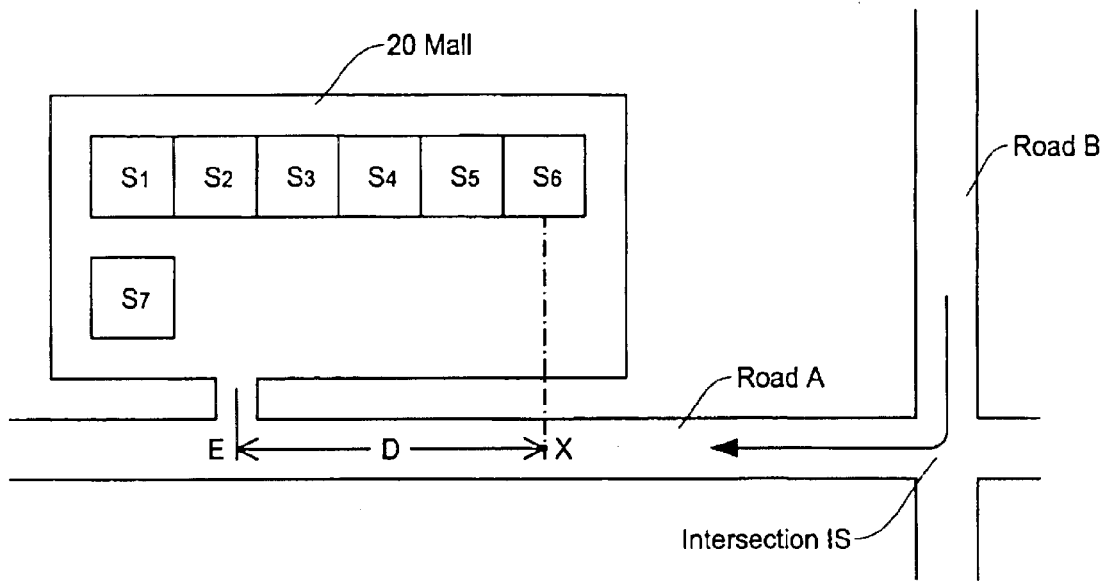
FIG. 4 is a schematic diagram showing a basic concept of the navigation method of the present invention when the destination is in the large compound.
Figure 5:
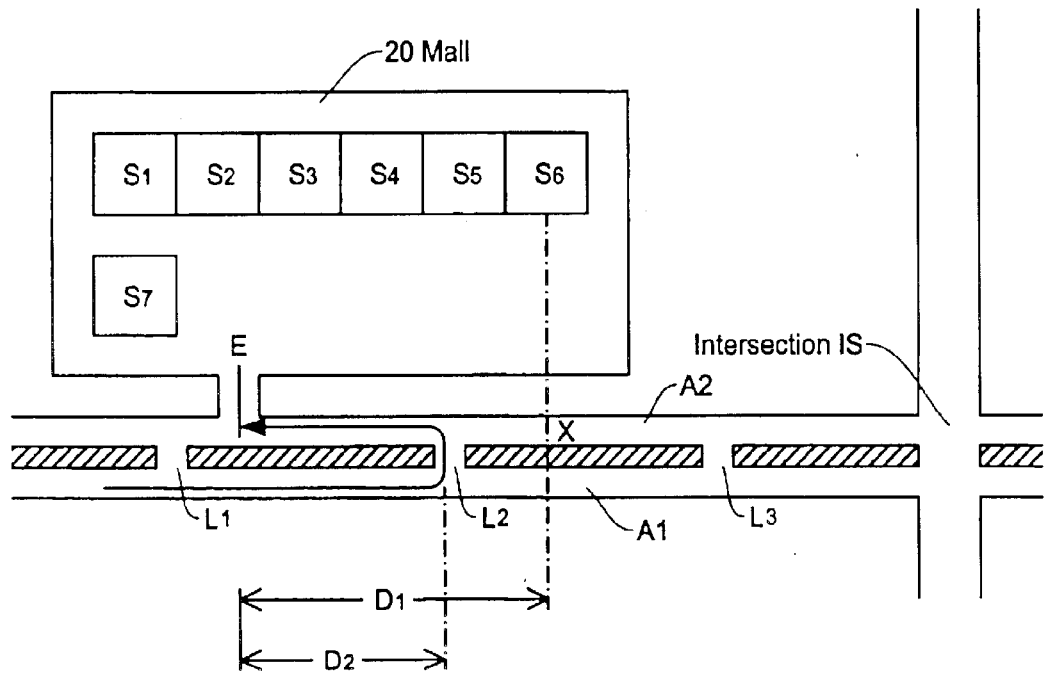
FIG. 5 is a schematic diagram showing another basic concept of the navigation method of the present invention when the destination is in the large compound.

FIG. 4 shows a basic concept of the navigation method of the present invention. In this example, when the destination is a shop S6 within the shopping mall 20, the navigation system determines the address of the shop based on the map data. As noted above, the address number X on the road A is the original address of the shop S6. Based on the map data such as by POI (point of interest) information, the navigation system interprets that the destination (shop S6) is within a large compound, i.e., the shopping mall 20. For example, if the POI faces a divided road (two one-way roads) as shown in FIG. 5, the navigation system determines that the destination may be within the large compound.

Then, the navigation system searches for an entrance E (target address) of the shopping mall 20 by detecting a link (depending on the map data, it may be defined as a "node") from the road A to the mall 20 in the map data. Typically, the map data includes such link data connecting between the road A and the shopping mall 20 although the conventional navigation systems are not using such link data. In the present invention, such a search is conducted within a predetermined distance from the original address X along the road A. Preferably, the navigation system looks for such a link in both backward and forward directions (left and right from address X in FIG. 4) along the road A from the original address X. Alternatively, such a search procedure is conducted along the road A from one end of the shopping mall 20 to another end of the shopping mall 20 if such data or equivalent thereof is available.

In the example of FIG. 4, the navigation system is able to find the entrance E of the mall 20 at the distance D from the original address X. If the entrance E is within a predetermined distance from the original address X, the navigation system determines that the entrance E is a correct target address. The navigation system then evaluates various routes to the target address (entrance E) from the start point (current user position) of FIGS. 3A and 3B. Thus, if the distance between the original address X and the target address E is large, the navigation system may produce a guided route to the target address E which is quite different from that would have been produced for the original address X.

Figure 1:
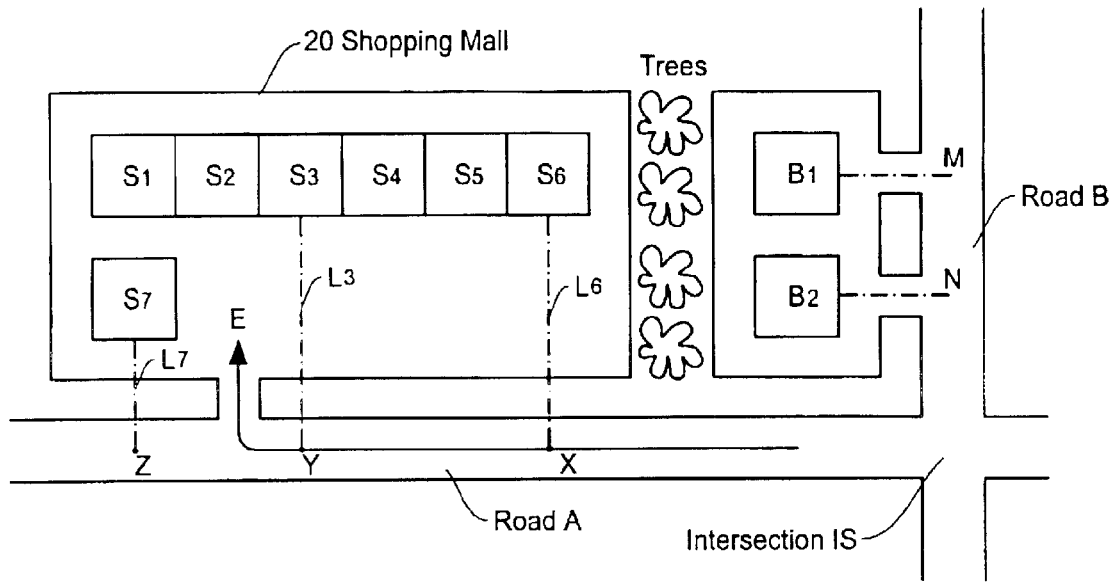
FIG. 1 is a schematic diagram showing an example of road map with shopping mall and other structures for describing the conventional navigation technology.
Figure 2:
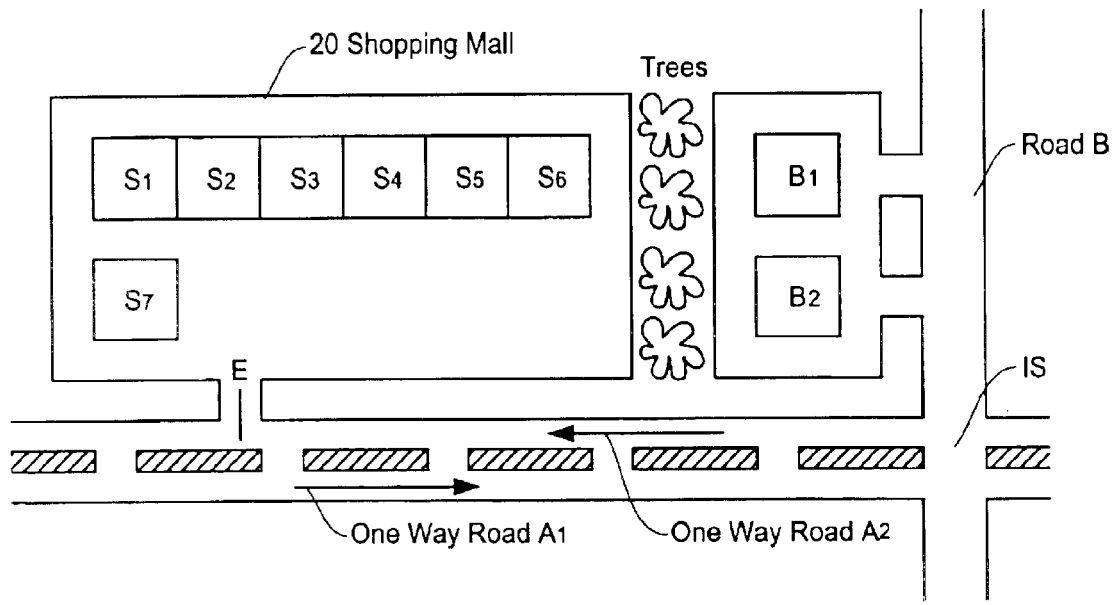
FIG. 2 is a schematic diagram showing another example of road map with shopping mall and other structures for describing the conventional navigation technology.

In the case shown in FIG. 2 where the road in front of the shopping mall 20 is considered as constituted by two one-way roads, the navigation method and system of the present invention searches for a link between the two one-way roads for possible U-turn. Such link data is ordinarily available in the map data although the conventional navigation systems do not use the link data for the purpose of taking the other one-way (U-turn). In the present invention shown in FIG. 5, in addition to the entrance E (target address) as noted above, the navigation system searches for links L1, L2, and L3 between the one-way road A1 and the one-way road A2. The navigation system also checks whether a link between the original address X and the target address E allows a U-turn of a vehicle (map data may define the U-turn by two consecutive left turns).

In the example of FIG. 5, suppose a U-turn is available at the link L2, a user taking the one-war road A1 does not have to go to the intersection IS to take the another one-way road A2. As noted above, the conventional navigation system forcibly guides the user to take only the one-way road A2 to enter the shopping mall, i.e., the unreasonable route shown in FIG. 3A taking the roads E D, E and A2. However, if such a route is shorter than other routes, the navigation system of the present invention rather recommends the user to take the one-way road A1 and make a U-turn at the link L2 to take the one-way road A2 to approach the target address E.

Figure 3A:
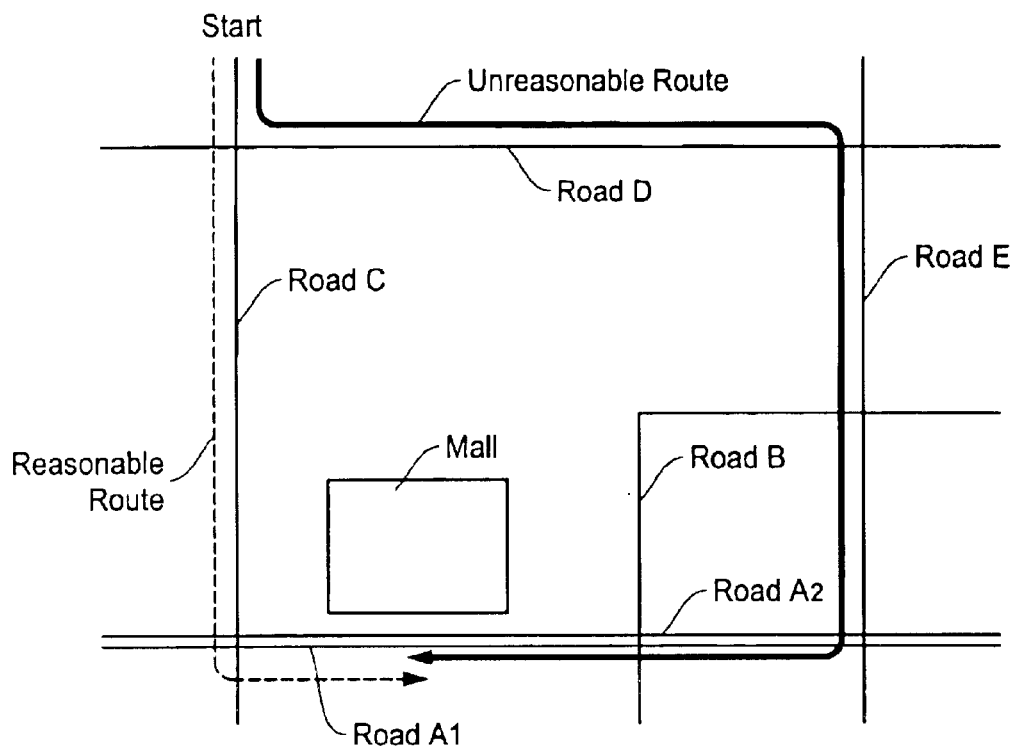
FIGS. 3A and 3B are schematic diagrams showing problems involved in the conventional navigation technology when the destination is in a large compound.
Figure 3B:
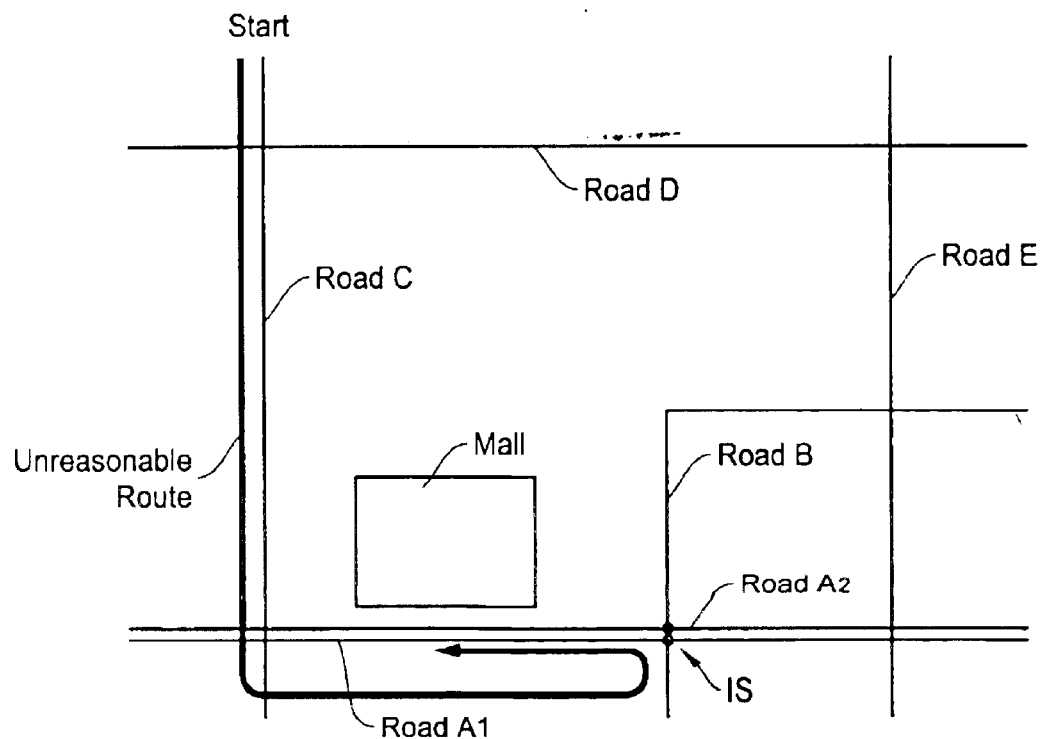

Consequently, the navigation system of the present invention is able to avoid the unreasonable routes arisen in the situation of FIGS. 3A and 3B. The navigation system produces the best route to the target address such as a reasonable route shown by the dotted line in FIG. 3A that takes the road C and the road A. Thus, the user does not have to travel the unreasonable route of FIG. 3A to reach the destination in the mall.

In the example of FIG. 5, suppose all of the links L1-L3 allow a U-turn for a vehicle in the one-way road A1 to take another one-way road A2, the navigation system determines which link is most appropriate for making a U-turn by the user. For example, the link L1 is inappropriate because it is impossible to enter the shopping mall 20. The navigation system calculates so that the link L2 is better than the link L3 because the U-turn at the link L2 achieves a shorter overall distance from the start point.

Figure 6:
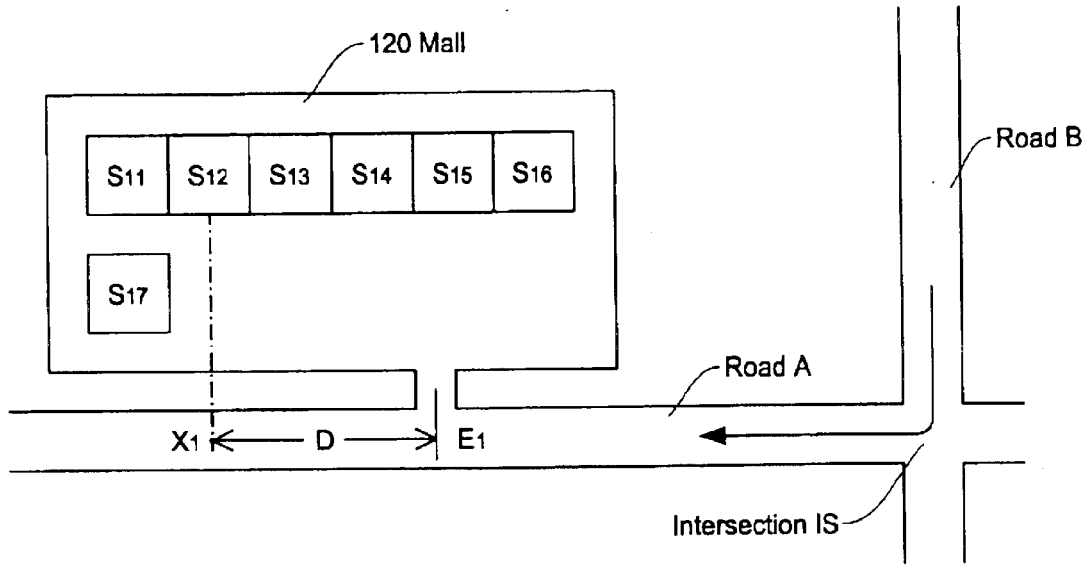
FIG. 6 is a schematic diagram showing a basic concept of the navigation method of the present invention where the relationship between the original address and the target address is reversed from that of FIG. 4.

FIG. 6 shows a case where the relationship between the original address and the target address is reversed from that in the foregoing example. When a user specifies a shop S12 in a shopping mall 120 as a destination, the navigation system detects an address of the shop S12 which has an address number (original address) X1 on the road A. Then, the navigation system searches for an entrance of the shopping mall 120 by locating a link to an entrance E1 on the road A along both directions on the road A. If the entrance E1 is detected within a predetermined distance from the original address X1, the navigation system determines that the entrance E1 is a correct target address and calculates appropriate routes to the target address E1.

Figure 7A:
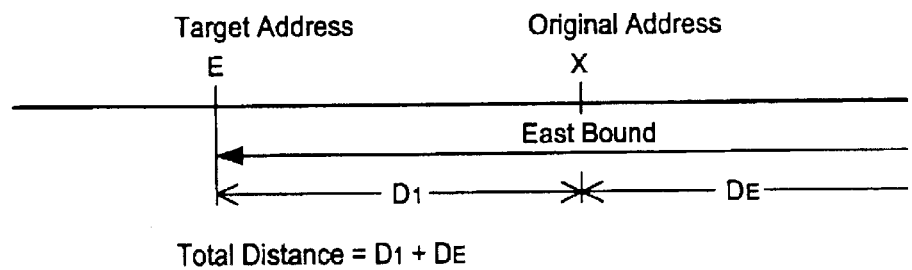
FIGS. 7A and 7B are schematic diagrams for calculating the distance to the target address in the situations corresponding to FIGS. 4 and 5.
Figure 7B:
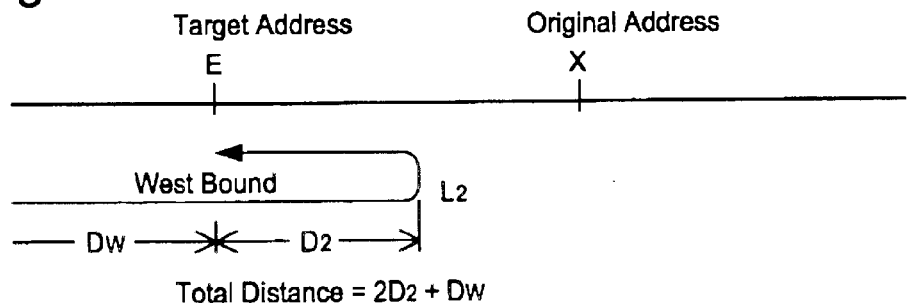

FIGS. 7A and 7B schematically show the distance to the target address in the route involved in the situations in FIGS. 4 and 5. In the route from the east shown in FIG. 7A (based on the east bound route of FIG. 3A), the total distance is the sum of the east bound distance DE (sum of roads D, E and A2 to the address X and the distance D1 between the original address X and the target address E. In the route from the west shown in FIG. 7B (based on the west bound route of FIG. 3B), the total distance is the sum of the west bound distance DW (sum of roads C and A1 to the link L2) and two times of the distance D2 between the link L2 (U-turn) and the target address E. Thus, the navigation system evaluates the total distances in the routes of FIGS. 7A and 7B and other factors (freeways, toll roads, traffic conditions, etc.) and determines the best route to the destination.

Figure 8:
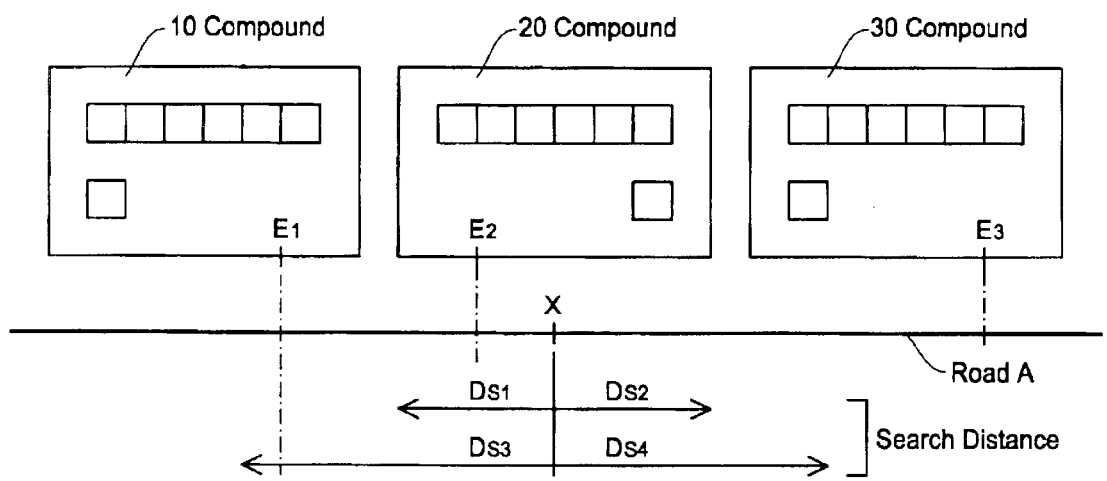
FIG. 8 is a schematic diagram showing a basic concept for determining a search distance for searching a link to the large compound from the original address.

FIG. 8 is a schematic diagram showing a basic concept for determining a search distance from the original address for detecting a link to the large compound. As described in the foregoing, the navigation system determines an original address X of the destination in the large compound and searches for a link (entrance E) between the compound and the road running in front of the compound. In FIG. 8, suppose an original address X of the road A represents the address of the destination in the compound 20, the navigation system looks for links to the compound 20 along both directions of the road A.

The distances Ds1 and Ds2 from the original address X to search for the entrance (target address) E2 of the compound 20 are determined experimentally based on various factors such as a typical size of a compound, a position of an original address relative to the compound, and the like. The search distance Ds1 in FIG. 8 is considered appropriate and the target address (entrance) E2 of the compound 20 is found within the distance. However, the search distance Ds3 in FIG. 8 is inadequately large because the navigation system will detect a link E1 to the next compound 10 which is different from the one having the destination.

Figure 9:
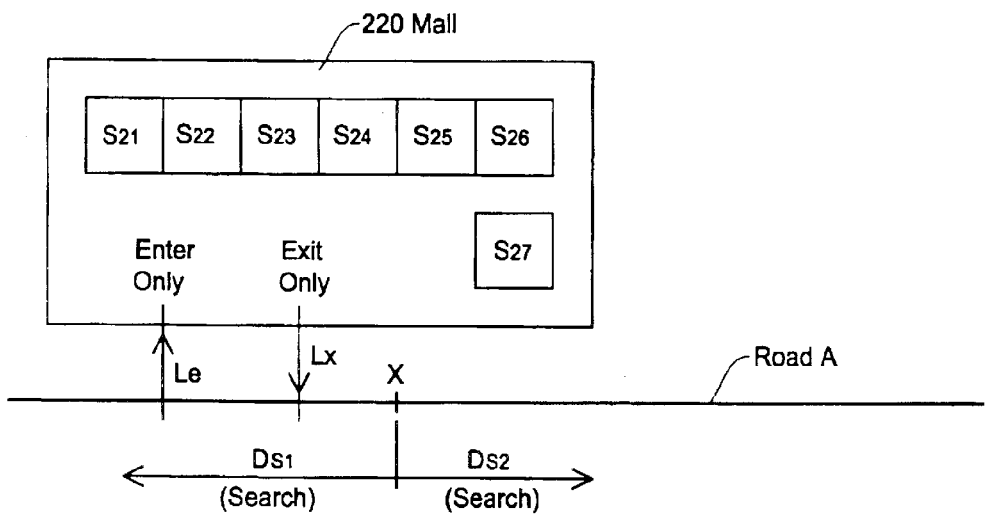
FIG. 9 is a schematic diagram showing a basic concept for determining an appropriate link to the large compound from the original address.

FIG. 9 is a schematic diagram showing a basic concept for determining an appropriate link to the large compound from the original address. Even when a link to the compound is found in the foregoing procedure, such a link may not always be an entrance to the compound but can be an exit only link. For example, in the example of FIG. 9, a shopping mall 220 has an exit only link Lx and an enter only link Le to the road A. Thus, the navigation system evaluates the type of link to the mall 220 and designates the enter only link Le as a target address.

Figure 10:
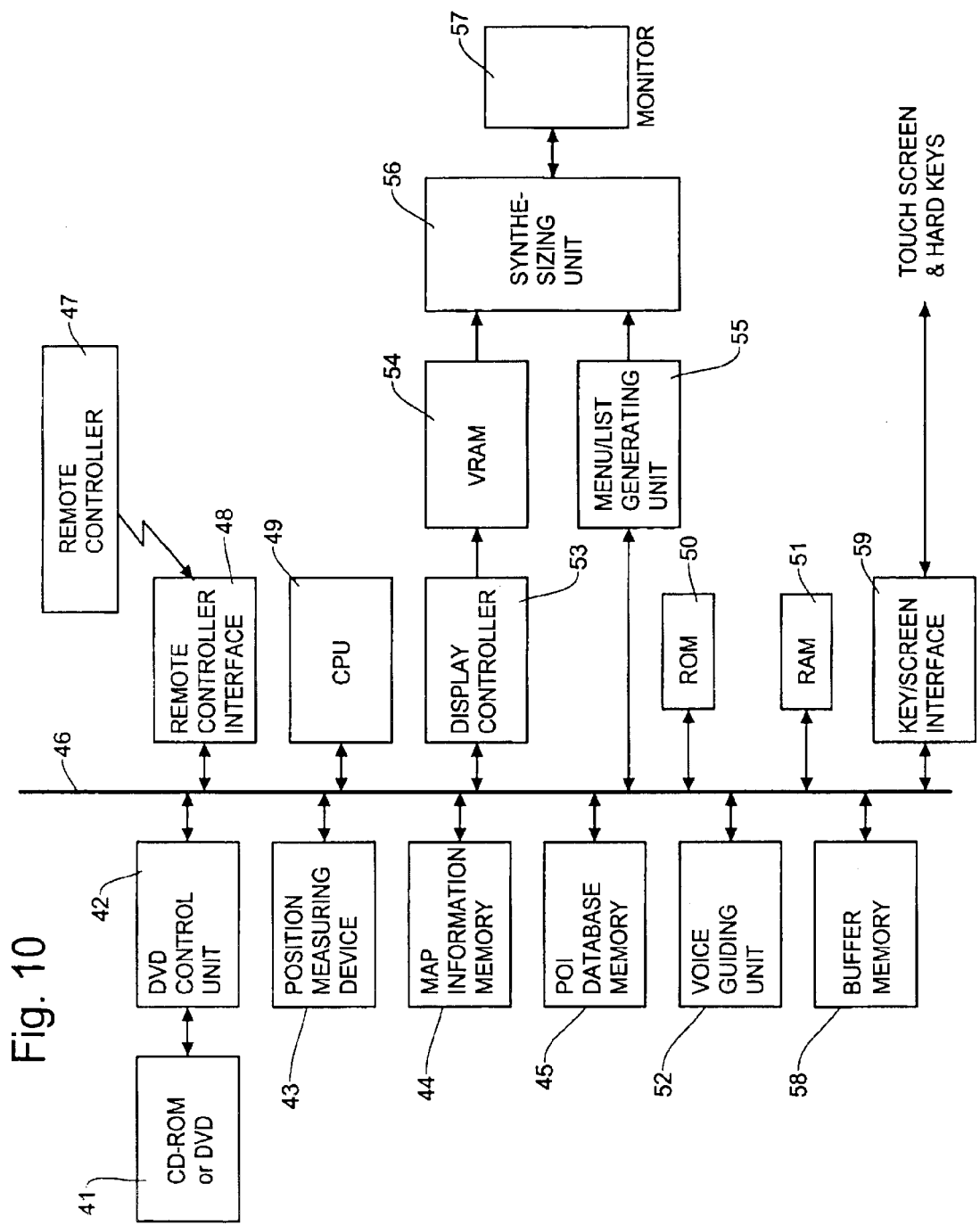
FIG. 10 is a block diagram showing an example of structure in a vehicle navigation system according to the present invention.

FIG. 10 is a block diagram showing an example of structure in a vehicle navigation system according to the present invention. In the block diagram of FIG. 10, the navigation system includes a map storage medium 41 such as a CD-ROM, DVD, hard disc or other storage means (hereafter "DVD") for storing map, data. The map data is directly used in the present invention without requiring a preestablished database indicating one-to-one relationship between destinations and entrances of large compound for finding an entrance nearest to a specified destination. The navigation system further includes a DVD control unit 42 for controlling an operation for reading the map information from the DVD, a position measuring device 43 for measuring the present vehicle position. The position measuring device 43 has a vehicle speed sensor for detecting a moving distance, a gyroscope for detecting a moving direction, a microprocessor for calculating a position, a GPS receiver, and etc.

The block diagram of FIG. 10 further includes a map information memory 44 for storing the map information which is read out from the DVD 41, a database memory 45 for storing database information such as point of interest (POI) information which is read out from the DVD 41, a remote controller (not shown) for executing a menu selection operation, an enlarge/reduce operation, a destination input operation, etc. and a remote controller interface 48.

The navigation system further includes a bus 46 for interfacing the above units in the system, a processor (CPU) 49 for controlling an overall operation of the navigation system, a ROM 50 for storing various control programs such as a route search program and a map matching program necessary for navigation control, a RAM 51 for storing a processing result such as a guide route, a voice interface and guiding unit 52 for voice communication interface and spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, a monitor (display) 57, a buffer memory 58 for temporarily storing data for searching a target address or comparing possible routes to the target address, etc., and a key and screen interface 59 for interfacing with various other input means such as hard keys and joystick on a display panel of the navigation system or a touch screen of the navigation system, and the like.

Figure 11:
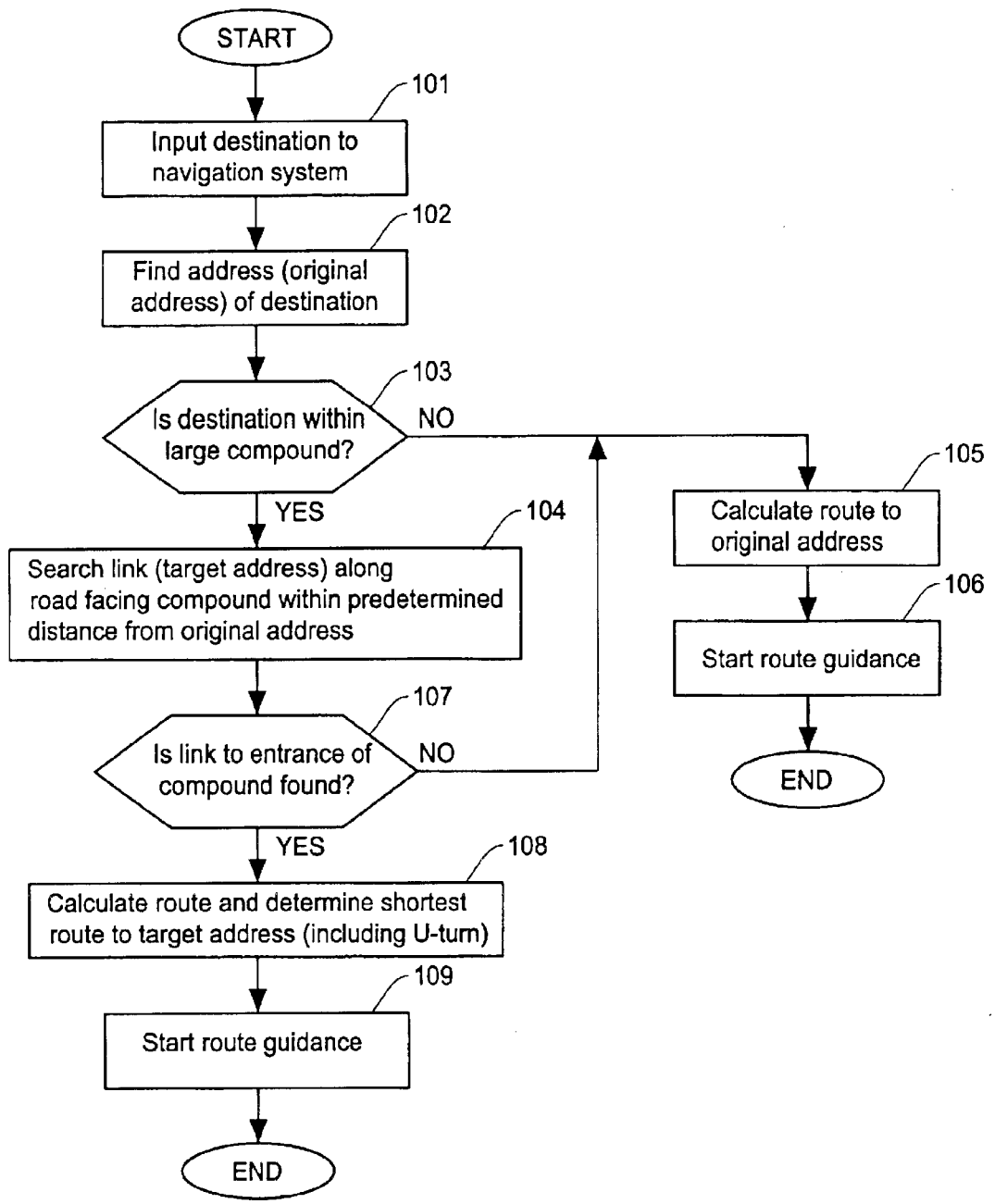
FIG. 11 is a flow chart showing an example of process in the navigation method of the present invention for determining the guided route to the target address.

FIG. 11 is a flow chart showing an example of process in the navigation method of the present invention for determining the guided route to the target address. In step 101, a user provides a destination to the navigation system where the destination is in a large compound such as a shopping mall, an apartment complex, or the like. Typically, such a destination is specified by the user by selecting a POI (point of interest) name from the list of POIs on the navigation screen.

The navigation system finds an address (original address) of the destination in the large compound. As noted above, typically, such an original address defines a position on the road running in front of the compound in such a way that an imaginary line from the destination perpendicularly intersects with the road at the position. Based on the original address, at step 103, the navigation system determines whether the specified destination is in a large compound or not. Such determination is made by evaluating the address of the destination as well as other POI information close proximity with the destination. Typically, if the specified address is on a divided road (two one-way roads of FIG. 2), the navigation system determines that the destination is within a large compound. If it is determined that the destination is unrelated to a large compound, the process moves to the steps 105 and 106 to calculate the route to the destination and start the route guidance mode.

In contrast, if it is determined that the destination is within a large compound, in step 104, the navigation system searches for a link connecting the road and the large compound, i.e., an entrance (target address) to the large compound. If the entrance is found within a predetermined distance from the original address in step 107, the navigation system evaluates various routes to the target address and determines a best route, at step 108, which is typically the shortest route to the target address. As noted above, such a best route may include a U-turn from one one-way road to another one-way road. Then, in step 109, the navigation system starts the route guidance mode.

As has been described above, according to the present invention, the navigation method and system of the present invention is designed to search a link (entrance) to a large compound within a predetermined distance from an original address. When the link is found, the navigation system determines that the link as a target address and evaluates the possible route to the target address. In the case where the road in front of the large compound is constituted by two one-way roads, the navigation method and system of the present invention searches for a link between the two one-way roads. The navigation system also checks whether a link between the original address X and the target address E allows a U-turn of a vehicle. Thus, the navigation system is able to find the best route to the target address of the large compound including the U-turn from a one-way road to take another one-way road. The navigation system of the present invention does not need to use a specially created database indicating one-to-one relationship between a destination and an entrance of the large compound, thereby achieving the above noted effect with low cost.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation method for guiding a user to a destination specified by the user, comprising the following steps of:

specifying a destination in a navigation system;

examining an original address of the destination and judging whether the destination is within a large compound or not based upon map data on the market;

searching for an entrance of the large compound from a road running along the large compound where the original address is on the road by finding a link connecting the road and the large compound by evaluating the map data in backward and forward directions on the road, the entrance being searched within a predetermined distance from the original address in the backward and forward directions;

defining the entrance of the large compound as a target address to the destination; and selecting a best route to the target address and starting a route guidance mode to guide the user to the entrance of the large compound.

2. A navigation method as defined in claim 1, wherein said step of judging whether the destination is within the large compound includes a step of evaluating the address of the destination as well as information on other POIs close proximity with the destination.

3. A navigation method as defined in claim 1, wherein said step of searching for the entrance of the large compound includes a step of specifying the predetermined distance on the road from the original address for searching for the entrance to the large compound.

4. A navigation method as defined in claim 1, further comprising a step of finding a link connecting between two one-way roads when the map data defines that the road along the large compound as being constituted by said two one-way roads and selecting an optimum link for reaching the target address when two or more links exist for the road.

5. A navigation method as defined in claim 4, wherein said step of finding and selecting the link between the two one-way roads includes a step of finding a link allowing a U-turn from one one-way road to another one-way road.

6. A navigation method as defined in claim 5, wherein said step of finding the link between the two one-way roads includes a step of selecting a link allowing the U-turn from one one-way road to another one-way road which is closest to the target address.

7. A navigation system for guiding a user to a destination specified by the user, comprising:

means for specifying a destination in a navigation system;

means for examining an original address of the destination and for judging whether the destination is within a large compound or not based upon map data on the market;

means for searching for an entrance of the large compound from a road running along the large compound where the original address is on the road by finding a link connecting the road and the large compound by evaluating the map data in backward and forward directions on the road, the entrance being searched within a predetermined distance from the original address in the backward and forward directions;

means for defining the entrance of the large compound as a target address to the destination; and means for selecting an optimum route to the target address and for starting a route guidance mode to guide the user to the entrance of the large compound.

8. A navigation system as defined in claim 7, wherein said means for judging whether the destination is within the large compound includes means for evaluating the address of the destination as well as information on other POIs close proximity with the destination.

9. A navigation system as defined in claim 7, wherein said means for searching for the entrance of the large compound includes means for specifying the predetermined distance on the road from the original address for searching for the entrance to the large compound.

10. A navigation system as defined in claim 7, further comprising means for finding a link connecting between two one-way roads when the map data defines that the road along the large compound as being constituted by said two one-way roads and selecting an optimum link for reaching the target address when two or more links exist for the road.

11. A navigation system as defined in claim 10, wherein said means for finding and selecting the link between the two one-way roads includes means for finding a link allowing a U-turn from one one-way road to another one-way road.

12. A navigation system as defined in claim 11, wherein said means for finding the link between the two one-way roads includes means for selecting a link allowing the U-turn from one one-way road to another one-way road which is closest to the target address.

* * * * *